June 30, 1936.  C. J. BENOLKEN  2,045,826
AUTOMOBILE HEATING AND DEFROSTING APPARATUS
Filed March 8, 1934
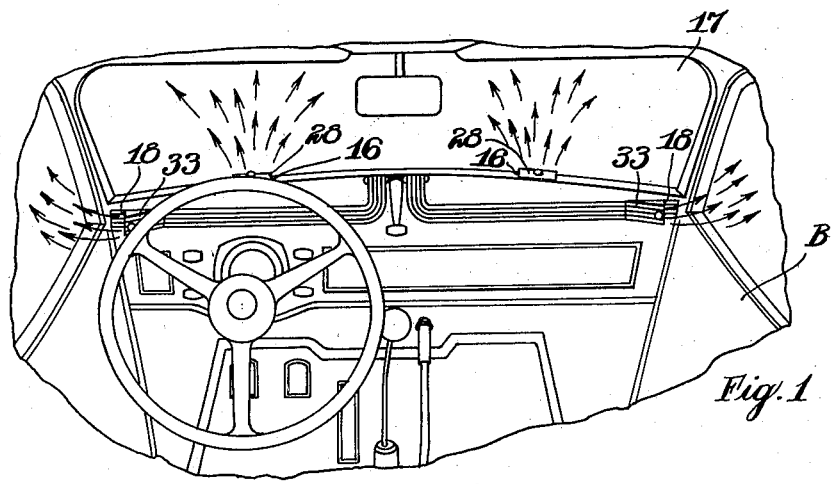
Fig. 1
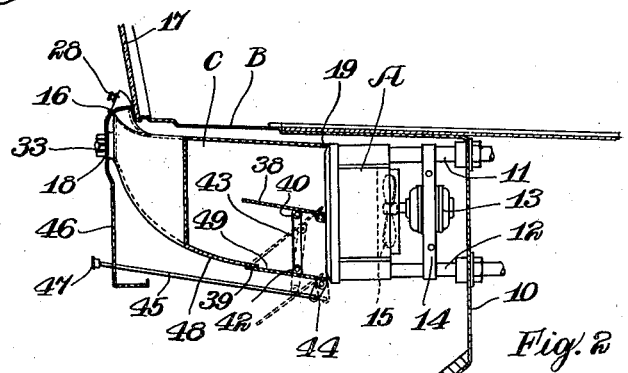
Fig. 2
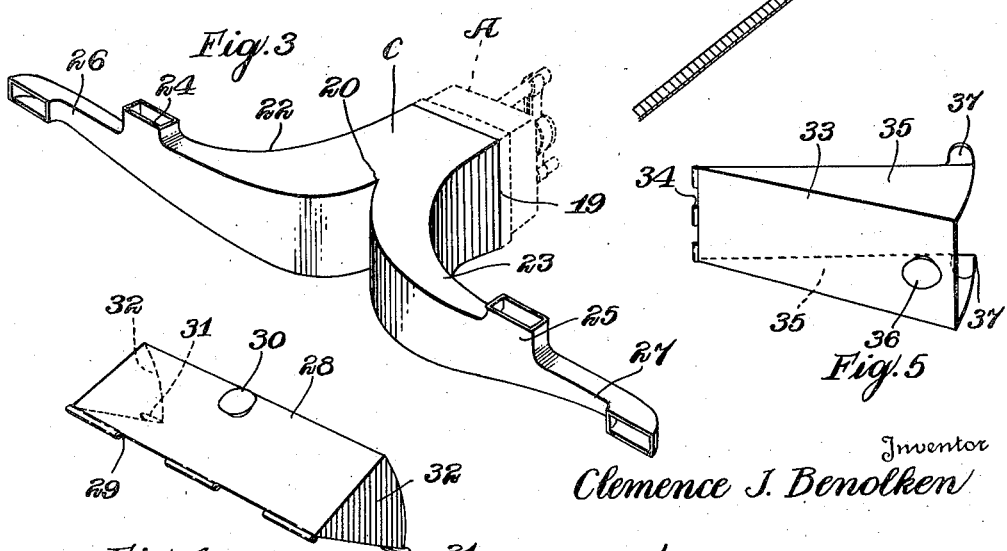
Fig. 3
Fig. 5
Fig. 4
Inventor
Clemence J. Benolken
By Howard Fischer
Attorney Patented June 30, 1936

2,045,826

UNITED STATES PATENT OFFICE 2,045,826

AUTOMOBILE HEATING AND DEFROSTING APPARATUS

Clemence J. Benolken, St. Paul, Minn.

Application March 8, 1934, Serial No. 714,573

7 Claims. (Cl. 20—40.5)

My invention relates to an improvement in automobile heating and defrosting apparatus, wherein it is desired to provide an apparatus suitable for distributing heat throughout the body of an automobile or other vehicle and at the same time prevent the formation of a coating of frost or sleet on the windows of the car.

Means have previously been provided for use in combination with vehicle heaters for transferring heated air to a nozzle secured adjacent the windshield of the vehicle. Means have also been provided for producing a blast of air over the outer surface of the windshield. These appliances, however, are bulky and cumbersome, unsightly and inefficient.

It is the object of my invention to provide a means for use in combination with a heater of any suitable type to convey heated air through a portion of the body of the car and directly through the frame to the windshield or window to which it is applied. Closures at the ends of these conveying means may be selectively opened to provide a draft of heated air at the point where it is most needed. In this manner the entire system is concealed and direct, resulting in a minimum of heat losses and at the same time enhancing the appearance of the vehicle interior.

It is an object of my invention that a means may be provided for directing a draft of air upon the side windows of the vehicle as well as against the windshield. It is quite necessary in driving to have clear vision through these side windows as well as through the windshield in order to make driving absolutely safe. With previous constructions it has been impossible or impractical to provide such a draft for the side windows.

It is an object of my invention to provide a means for selectively deflecting a part or all of the air from the car heater against the windows of the car. This feature is of special advantage where the heater is cold. When persons in warm clothing enter a cold car, the windows quickly frost up, even when frost shields are used on the windows. With my apparatus, it is possible to start the fan often used in connection with a vehicle heater and to deflect all of the air impelled by the fan against the windows of the vehicle. The circulation of this air against the windows will act to prevent the formation of a coating of frost thereupon, even when the heater is cold.

It is also the purpose of my invention to heat the interior of the vehicle without directing the usual blast of hot air toward one particular portion of the car. Vehicle heaters are often provided with deflectors to deflect the blast of air to one side or to another in order to prevent undue heating in one point of the car. With my apparatus, however, it is possible to admit heated air from a number of openings against the windows of the car, spreading the heat throughout the entire body of the car uniformly. A means is also provided to direct air downward against the feet of the occupants of the front seat, and this means can be adjusted to properly proportion the heat thus directed.

In directing heated air against the windows of the vehicle, it is obvious that the glass will be heated sufficiently to prevent the formation of ice on the outer surface of the glass in cold rainy or sleeting weather. Accordingly, driving is made safer and comfortable in any type of cold weather. In warm weather, all of the outlets from the heater may be closed.

These and other objects and features of my invention will be more clearly and fully set forth in the following specification.

In the drawing forming a part of the specification:

Figure 1 is a diagrammatic view of a portion of a vehicle interior, illustrating an arrangement of duct openings capable of directing air against the front and side windows of the vehicle.

Figure 2 is a cross sectional view longitudinally through a portion of a vehicle, showing a heater and air conducting ducts.

Figure 3 illustrates in perspective a detail view of an air duct for conveying heat from the heater to the openings adjacent the windows of the vehicle through the body of the vehicle.

Figure 4 discloses a closure for the end of the duct adjacent the windshield of the vehicle.

Figure 5 shows a closure suitable for closing the end of the duct adapted to direct air against the side windows of the vehicle.

The vehicle heater A is adapted to heat the interior of the automobile B. While the heater A may be of any suitable or desirable type, in the drawing it is shown in the form of a common type of hot water or steam heater secured to the dash board 10 of the automobile B, by means of the pipes 11 and 12. A motor 13 is secured by a suitable bracket 14 in the rear of the heater A, and drives a fan 15. This fan 15 forces air through the heater A to heat the air.

Adjacent the front of the heater A is secured an air duct C suitable for receiving the air forced through the heater. The duct C extends from the front of the heater A to suitable openings 16 in the frame of the windshield 17 of the automobile A, and to openings 18 in the instrument panel of the same. While a slightly different formation of duct is necessary for each type of automobile, the duct C shown in Figure 3, is illustrative of one type of duct suitable for use with certain types of cars.

In the duct C shown in Figure 3 of the drawing, the edge 19 of the same adjacent the heater A is shaped to fit closely against the heater and the duct extends forwardly from the heater for a short distance tapering somewhat in size. At the point 20 the duct splits to form separate branches 22 and 23 spreading in opposite directions. At points spaced substantially apart, each of the branches 22 and 23 are provided with upwardly extending passages 24 and 25 to convey heated air to the openings 16 adjacent the windshield of the vehicle. The branches 22 and 23 extend somewhat beyond the passages 24 and 25, forming passages 26 and 27 conveying heated air to the openings 18 in the instrument panel of the automobile.

The openings 16 are equipped with closures 28 of the type illustrated in Figure 4 of the drawing. The closures 28 are hinged along one edge 29, and may be opened or closed by any suitable means, such as the knob 30. Sides 32 are provided for the closures 28 so that the closures may act as a spout to direct the heated air against the glass of the windshield 17. Lugs 31 on the sides 32 limit the opening movement of the pivoted closures 28 in their movement in that portion of the frame adjacent the windshield 17.

The openings 18 are provided with closures 33 as illustrated in Figure 5 of the drawing. Each closure is hinged at 34 and is provided with sides 35, so that these closures may also act as spouts to direct the air toward the side windows of the vehicle. Knobs 36, or other suitable means may be employed to open and close the closures 33, and lugs 37 on the sides 35 limit the opening movement of these closures.

In order to direct more or less of the air heated by the heater A toward the feet of occupants of the front seat of the vehicle, I provide shutters 38 and 39 pivoted to the duct C near the edge 19 of the duct adjacent the heater A. These shutters 38 and 39 are provided with ears 40 and 42 providing a means of pivotally connecting the shutters to a link 43 permitting both shutters to pivot in unison. An arm 44 on the lower shutter 39 is connected to a rod 45 extending through the instrument panel 46 of the automobile B. By pushing in or pulling out the rod 45 to which is attached an operating knob 47, the position of the shutters 38 and 39 may be varied.

It will be noted that in the full line position of Figure 2, the shutter 39 overlaps the bottom 48 of the duct C and entirely closes the opening 49 in this duct which is filled by the shutter 39. As the shutter 39 is pivoted downwardly, however, the opening 49 is uncovered. Simultaneously, the upper shutter 38 acts to direct more of the air driven through the heater A by the fan 15 toward this opening. In its extreme lowermost position, the upper shutter 38 contacts the bottom 48 of the duct C and directs all of the air from the lower portion of the heater A out through the opening 49 in the bottom 48 of the duct C, the rest of the air passing through the duct to be exhausted through any of the openings 16 or 18 which are open.

In operation, when occupants enter a cold car, the shutters 38 and 39 may be placed in the full line position illustrated in Figure 2. The switch of the motor 13 may be operated to start the fan 15 in operation. The closures 28 and 33 may be opened to force a draft of air over the windshield and the side windows, or some of these closures may be kept closed in order to direct more air through the open closures, as desired. In this manner the coating of frost often forming on the windows when the occupants first enter the car may be avoided.

As the vehicle motor is started, and the heater A is heated, the shutters 38 and 39 may be operated to direct heated air toward the feet of occupants of the front seat of the vehicle if it is desired. A steady draft of air may be maintained over the surfaces of the windshield and the side windows through any open openings 16 or 18, dispensing heated air into the body of the vehicle in a manner to prevent a draft of air upon any single passenger.

It will be seen that the duct C is entirely enclosed and concealed, and that the air passes through a portion of the body of the car in being conveyed. The force of the air is retained at a maximum by the tapering duct, and by the direct flow from the heater to the desired openings. In severe weather when ice is forming on the outside of the vehicle, the closures 28 and 33 not directly in front of the vehicle driver may be closed to direct a concentrated blast of air against the glass at one point, heating the glass so as to prevent formation of ice thereupon.

While I have described a certain type of heater, it is obvious that any suitable type may be substituted therefor. It is also obvious that certain modifications must be made to the structure shown in order to make the device adapted for use upon various makes of cars.

In accordance with the patent statutes, I have described the principles of operation of my apparatus for heating and defrosting automobiles, and while I have endeavored to set forth the best embodiment thereof, I desire to have it understood that the use thereof may be varied as well as the structural details within the scope of the following claims:

I claim:

1. An automobile heating apparatus including, a heating unit, a conduit for conveying heated air from said heater, a windshield frame having openings therethrough connecting with said conduit, and closures for said openings operable in open position for directing the heated air against the windshield.

2. In combination, a heating unit, an automobile instrument panel, a windshield frame adjacent said instrument panel, and a conduit connecting said heating unit to openings in said instrument panel and said windshield frame to direct heated air from said heater through said openings.

3. An automobile heating and defrosting apparatus including, a heating unit, an instrument panel, a windshield, a frame therefor, openings in said instrument panel and said frame within the automobile, and a conduit connecting said heater and said openings to convey air heated by said heater through said openings.

4. An automobile heating and defrosting apparatus including, a heating unit, a windshield, a frame about said windshield, openings in said frame, closures in said openings operable in open position for directing heat against said windshield, and means for selectively adjusting said closures to direct more or less air through said openings, and conduit means connecting said heater with said openings.

5. An automobile heater and defrosting apparatus including, a heating unit, a windshield, a frame about said windshield, openings in said frame, conduit means connecting said heater with said openings to direct heated air thereto, and deflector closures for said openings to deflect more or less air to said windshield.

6. In combination, an automobile windshield frame, a downwardly extending panel adjacent said windshield frame, said frame and said panel having openings therein, a heating unit, and a conduit extending from said heating unit to said openings to direct heated air from said heater through said openings.

7. In combination, an automobile windshield frame, a downwardly extending panel adjacent said windshield frame, said frame and said panel having openings therein, an air circulating unit, and a conduit extending from said unit to said openings to direct air from said unit through said openings.

CLEMENCE J. BENOLKEN.